(12) United States Patent
Tanaka (10) Patent No.: US 10,197,002 B2
(45) Date of Patent: Feb. 5, 2019

(54) FUEL INJECTION CONTROL DEVICE FOR INTERNAL COMBUSTION ENGINE

(71) Applicant: DENSO CORPORATION, Kariya, Aichi-pref. (JP)

(72) Inventor: Makoto Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 1 day.

(21) Appl. No.: 15/501,523

(22) PCT Filed: Jul. 14, 2015

(86) PCT No.: PCT/JP2015/003555
§ 371 (c)(1),
(2) Date: Feb. 3, 2017

(87) PCT Pub. No.: WO2016/021122
PCT Pub. Date: Feb. 11, 2016

(65) Prior Publication Data
US 2017/0226950 A1    Aug. 10, 2017

(30) Foreign Application Priority Data

Aug. 6, 2014    (JP) .................................. 2014-160086

(51) Int. Cl.
*F02D 41/00*    (2006.01)
*F02D 41/24*    (2006.01)
(Continued)

(52) U.S. Cl.
CPC ......... *F02D 41/2467* (2013.01); *F02D 41/20* (2013.01); *F02D 41/402* (2013.01);
(Continued)

(58) Field of Classification Search
CPC .......................... F02D 41/2467; F02M 51/061
See application file for complete search history.

(56) References Cited

U.S. PATENT DOCUMENTS

| | | | |
|---|---|---|---|
| 3,982,505 A | * | 9/1976 | Rivere .................... F02D 41/20 123/490 |
| 4,350,132 A | * | 9/1982 | Harsch .................... F02D 41/20 123/472 |

(Continued)

FOREIGN PATENT DOCUMENTS

JP    2004-278411    10/2004

*Primary Examiner* — Hieu T Vo
*Assistant Examiner* — Sherman Manley
(74) *Attorney, Agent, or Firm* — Nixon & Vanderhye P.C.

(57) ABSTRACT

An engine includes a fuel injector. The fuel injector includes a valve body and an electromagnetic part that moves by energizing the valve body from a valve-closed position to a valve-open position. The fuel injector injects fuel when the valve body is moved to the valve-open position. In fuel injection, an ECU feeds a pre-charge current smaller than a current for operating the valve body, to the electromagnetic part in a pre-charge period at the beginning of a start of energization, and subsequently feeds a drive current for operating the valve body, to the electromagnetic part. Further, the ECU acquires a current change parameter as a parameter correlated with a speed of a rising change in drive current, and controls the feed of the pre-charge current to the electromagnetic part of the fuel injector, based on the acquired current change parameter.

11 Claims, 10 Drawing Sheets

(51) Int. Cl.
*F02D 41/20* (2006.01)
*F02M 51/06* (2006.01)
*F02D 41/40* (2006.01)
*F02D 41/14* (2006.01)

(52) U.S. Cl.
CPC ..... *F02M 51/061* (2013.01); *F02D 2041/141* (2013.01); *F02D 2041/1409* (2013.01); *F02D 2041/2003* (2013.01); *F02D 2041/2034* (2013.01); *F02D 2041/2044* (2013.01); *F02D 2041/2058* (2013.01); *F02D 2200/503* (2013.01); *F02M 51/0664* (2013.01); *Y02T 10/44* (2013.01)

(56) References Cited

U.S. PATENT DOCUMENTS

| | | | | |
|---|---|---|---|---|
| 4,599,674 | A * | 7/1986 | Ishikawa | H01H 47/043 361/154 |
| 5,955,792 | A * | 9/1999 | Fischer | H01F 7/1844 307/131 |
| 6,142,124 | A * | 11/2000 | Fischer | F02D 41/20 123/490 |
| 6,578,556 | B2 * | 6/2003 | Ricco | F02D 41/20 123/490 |
| 6,766,788 | B2 * | 7/2004 | Xu | F02D 41/20 123/490 |
| 2003/0071613 | A1 * | 4/2003 | Schultz | H01F 7/1844 324/207.16 |
| 2009/0071443 | A1 * | 3/2009 | Miyake | F02D 41/20 123/446 |
| 2012/0318883 | A1 | 12/2012 | Kusakabe et al. | |
| 2015/0144109 | A1 | 5/2015 | Mukaihara et al. | |

* cited by examiner

| PRE-CHARGE TIME [ms] | | INTERVAL TIME [ms] | | | | |
|---|---|---|---|---|---|---|
| | | 0.4 | 0.6 | 0.8 | 1.0 | 1.5 |
| CURRENT VALUES IMMEDIATELY BEFORE COMPLETION OF ENERGIZATION [A] | 2.35 | 0 | 0.3 | 0.3 | 0.6 | 0.6 |
| | 5.0 | 0 | 0 | 0.3 | 0.3 | 0.6 |
| | 7.5 | 0 | 0 | 0 | 0.3 | 0.6 |

FUEL INJECTION CONTROL DEVICE FOR INTERNAL COMBUSTION ENGINE

CROSS REFERENCE TO RELATED APPLICATION

This application is the U.S. national phase of International Application No. PCT/JP2015/003555 filed Jul. 14, 2015, which designated the U.S. and claims priority to Japanese Patent Application No. 2014-160086 filed on Aug. 6, 2014, the entire contents of each of which are incorporated herein by reference.

TECHNICAL FIELD

The present disclosure relates to a fuel injection control device for an internal combustion engine.

BACKGROUND ART

There has been known, for example, a fuel injector of an electromagnetic solenoid type that supplies fuel to cylinders of an internal combustion engine mounted in a vehicle or the like. With regard to the fuel injector of this type, the timing to inject fuel and the amount of fuel to be injected are controlled in such a manner that a valve body (a needle) is driven in a valve-opening direction by controlling a timing and a time period to electrify a coil incorporated in the fuel injector.

In addition, there has been proposed a method of driving the fuel injector, the method involving applying a high voltage to the coil at the beginning of valve opening and, thereafter, applying a low voltage to the coil (i.e., changing the applied voltage from the high voltage to a low voltage). According to this technique, the fuel injector is driven with low power by enhancing the valve-opening responsiveness with the high applied voltage and then changing to the low applied voltage. Further, the high applied voltage is changed to the low applied voltage based on a detection current to be detected by a current detection circuit. Specifically, the applied voltage is changed when it is determined that the detection current reaches a predetermined target peak value.

It is considered that variations in fuel injection devices cause variations in actual drive current. The variations in drive current might cause variations in amount of fuel to be injected. Hence, Patent Literature 1 discloses a technique of correcting a target drive current based on the amount of variations in actual drive current due to the individual difference of the fuel injection devices. The amount of the individual difference of the fuel injection device is stored in a storage part in advance.

However, it is considered that the individual differences in fuel injection devices are not uniform and change with a lapse of time. Therefore, it is considered that technical improvements are necessary for eliminating the variations in amount of fuel to be injected.

With regard to the driving of the fuel injector, there has also been known a technique of feeding a pre-charge current smaller than a current for operating the valve body, to the coil at the beginning of the start to electrify the fuel injector and, subsequently, feeding a drive current for operating the valve body, to the coil. The inventors of this application have focused attention particularly on the condition of energization in a pre-charge period and have made attempts to suppress the variations in fuel to be injected, through improvements in pre-charge control.

PRIOR ART LITERATURE

Patent Literature

Patent Literature 1: JP 2014-5740 A

SUMMARY OF INVENTION

It is an object of the present disclosure to provide a fuel injection control device for an internal combustion engine, the fuel injection control device being capable of appropriately controlling the amounts of fuel to be injected.

A fuel injection control device is applied to an internal combustion engine including a fuel injector that includes a valve body and an electromagnetic part configured to move by energizing the valve body from a valve-closed position to a valve-open position and injects fuel when the valve body is moved to the valve-open position. The fuel injection control device is configured to, in fuel injection, feed a pre-charge current smaller than a current for operating the valve body, to the electromagnetic part in a pre-charge period at the beginning of a start of energization, and subsequently feed a drive current for operating the valve body, to the electromagnetic part. The fuel injection control device includes: a parameter acquisition part that acquires a current change parameter as a parameter correlated with a speed of a rising change in the drive current; and a pre-charge control part that controls the feed of the pre-charge current to the electromagnetic part, based on the current change parameter acquired by the parameter acquisition part.

In fuel injection with the fuel injector, in cases of feeding the pre-charge current prior to the feed of the drive current for driving the valve body, for example, if drive circuits for driving the fuel injector vary due to an individual difference or a secular change, the amount of energy to be applied by pre-charging to the electromagnetic part becomes excessive or short. This might cause variations in amount of fuel to be injected. According to the above configuration, the feed of the pre-charge current to the electromagnetic part of the fuel injector is controlled based on the current change parameter correlated with the speed of the rising change in the drive current. In this case, the speed of the rising change in the drive current depends on the amount of energy to be applied in the pre-charge period immediately before the feed of the drive current. Therefore, the use of the current change parameter correlated with the speed of the rising change allows a grasp of the excess or shortage of the amount of energy to be applied by pre-charging to the electromagnetic part. Moreover, controlling the feed of the pre-charge current allows elimination of the excess or shortage of the amount of energy to be applied to the electromagnetic part. This leads to appropriate control of the amount of fuel to be injected.

BRIEF DESCRIPTION OF DRAWINGS

The above object as well as other objects, features, and advantages of the present disclosure will become more apparent from the following detailed description with reference to the accompanying drawings.

EMBODIMENTS FOR CARRYING OUT INVENTION

First Embodiment

Figure 1:
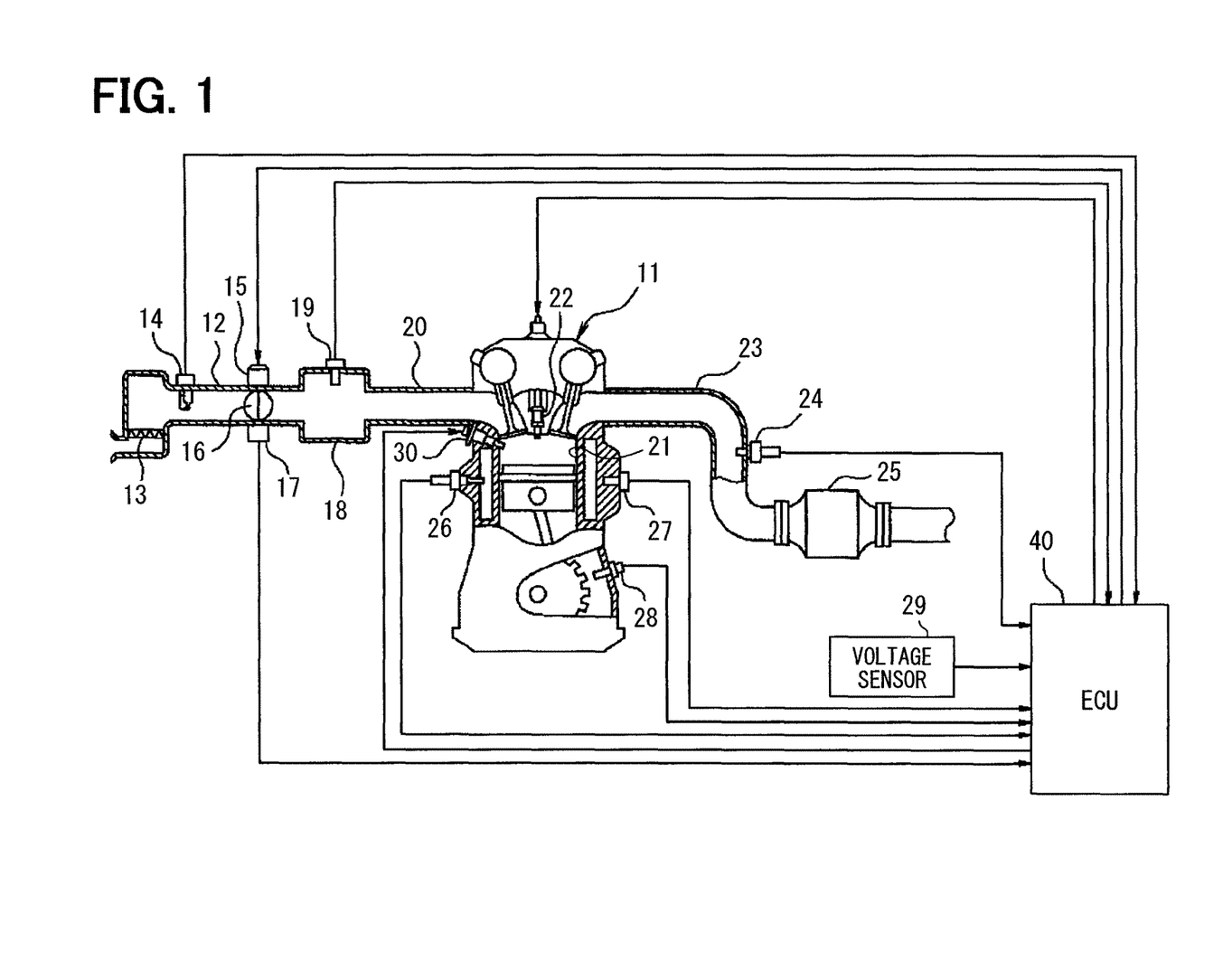
FIG. 1 illustrates a schematic configuration of an engine control system.

An embodiment of the present disclosure will be described below with reference to the drawings. The first embodiment provides a control system that controls a gasoline engine for a vehicle. With reference to FIG. 1, first, a description will be given of a general configuration of the engine control system.

An engine 11 is a direct injection multi-cylinder internal combustion engine and includes an intake pipe 12. An air cleaner 13 is disposed on the uppermost stream side of the intake pipe 12. An airflow meter 14 is configured to detect the amount of intake air and is disposed on the downstream side of the air cleaner 13. A throttle valve 16 having the degree of opening adjusted by a motor 15 is disposed on the downstream side of the airflow meter 14. A throttle position sensor 17 is configured to detect the degree of opening (i.e., the throttle position) of the throttle valve 16 and is disposed on the downstream side of the airflow meter 14.

A surge tank 18 is disposed on the downstream side of the throttle valve 16. The surge tank 18 is provided with an intake pressure sensor 19 that detects the pressure in the intake pipe 12. An air intake manifold 20 is configured to introduce air into each cylinder 21 of the engine 11 and is coupled to the surge tank 18. A fuel injector 30 of an electromagnetic type is configured to directly inject fuel into each cylinder 21 of the engine 11, and is mounted to each cylinder 21. An ignition plug 22 is mounted to each cylinder 21 at a cylinder head in the engine 11. The ignition plug 22 in each cylinder 21 generates spark discharge for igniting an air-fuel mixture in the cylinder.

The engine 11 includes an exhaust pipe 23 provided with an exhaust gas sensor 24 (e.g., an air-fuel ratio sensor, an oxygen sensor) that detects the air-fuel ratio, richness or leanness, and the like of the air-fuel mixture, based on the exhaust gas. A catalyst 25 such as a three-way catalyst is configured to clean the exhaust gas and is disposed on the downstream side of the exhaust gas sensor 24.

A cooling-water temperature sensor 26 is configured to detect a cooling water temperature and is mounted to a cylinder block in the engine 11. A knock sensor 27 is configured to detect knocking and is mounted to the cylinder block in the engine 11. A crank angle sensor 28 is configured to output a pulse signal every time a crank shaft has rotated by a predetermined crank angle, and is mounted to the outer periphery of the crank shaft. A crank angle and an engine speed are detected based on crank angle signals from the crank angle sensor 28. Outputs from these various sensors and outputs from a voltage sensor 29 that detects a battery voltage are successively inputted to an electronic control unit (ECU) 40.

The ECU 40 is an electronic control unit constituted mainly of a microcomputer and implements various kinds of control for the engine 11, using detection signals from the various sensors. The ECU 40 corresponds to a fuel injection control device. The ECU 40 calculates the amount of fuel to be injected, in accordance with an engine running state to control the fuel injected through the fuel injector 30 and the timing of ignition by the ignition plug 22.

Figure 2:
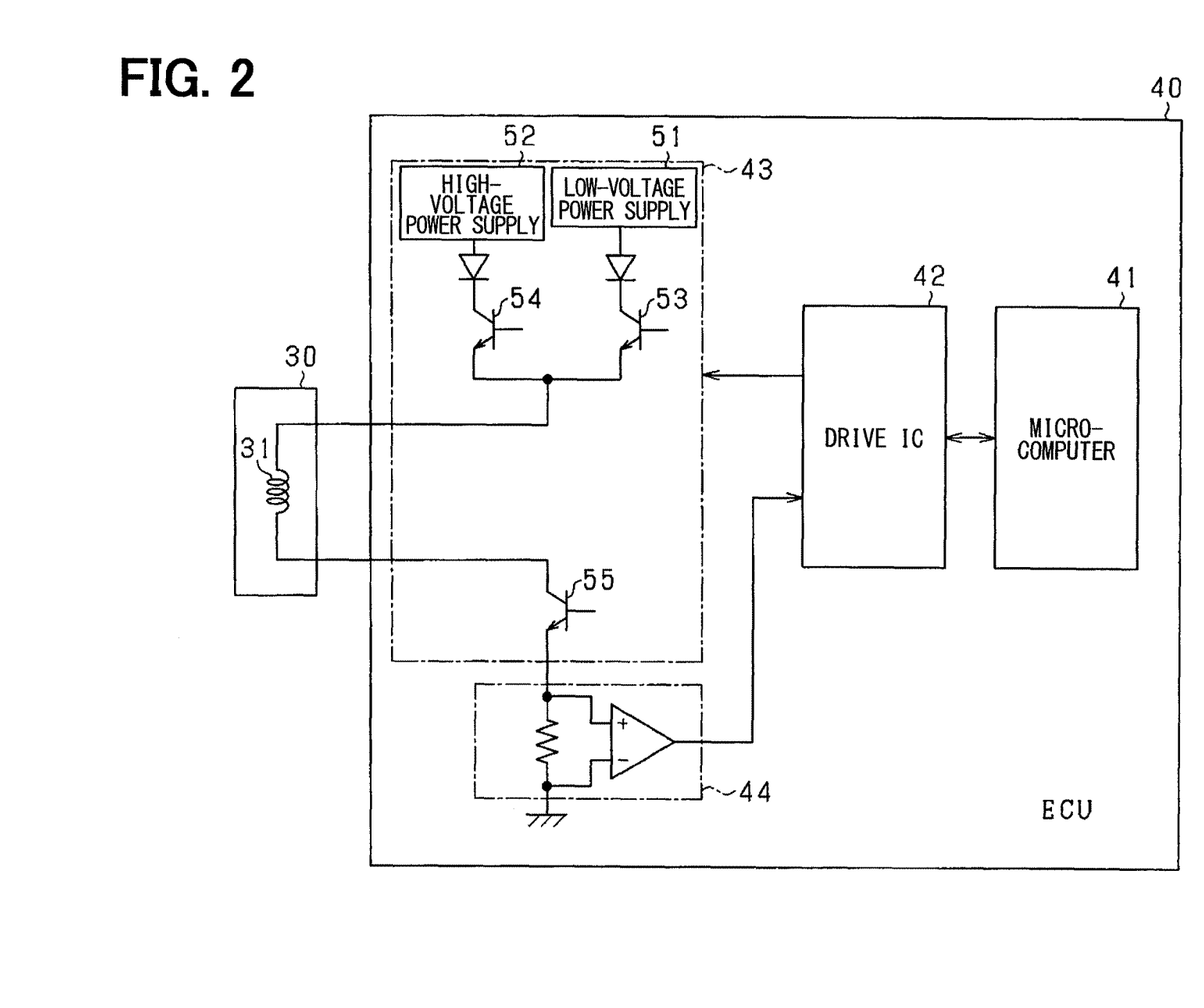
FIG. 2 is a block diagram illustrating a configuration of an ECU.

As illustrated in FIG. 2, the ECU 40 includes a microcomputer 41 for engine control (i.e., a microcomputer for controlling the engine 11), a drive integrated circuit (IC) 42 for driving an injector (i.e., a drive IC for the fuel injector 30), an electrifier 43, and a current detector 44. The microcomputer 41 calculates a required amount of injection in accordance with an engine running state (e.g., an engine speed, an engine load), and creates and outputs an injection pulse based on an injection time calculated based on the required amount of injection. The drive IC 42 and the electrifier 43 correspond to an injection valve drive part and a voltage changeover part, and open the fuel injector 30 with the injection pulse to cause the fuel injector 30 to inject fuel in an amount corresponding to the required amount of injection.

Specifically, the electrifier 43 includes a low-voltage power supply 51, a high-voltage power supply 52, and switching elements 53 to 55 that cause one of the low-voltage power supply 51 and the high-voltage power supply 52 to supply power to a coil 31 in the fuel injector 30. In this case, the low-voltage power supply 51 is constituted of a low-voltage output circuit that outputs a low voltage V1 of, for example, 12 V. The high-voltage power supply 52 is constituted of a high-voltage output circuit that outputs a high voltage V2 (a boosted voltage) of, for example, 60 to 65 V. The high-voltage power supply 52 includes a booster circuit that boosts a battery voltage. When the switching elements 53 and 55 are turned on, the low voltage V1 is applied to the coil 31. When the switching elements 54 and 55 are turned on, the high voltage V2 is applied to the coil 31. The low-voltage power supply 51 may also be configured to output different low voltages V1.

When the fuel injector 30 is opened with the injection pulse, the low voltage V1 and the high voltage V2 are applied to the coil 31 in the fuel injector 30 such that the low voltage V1 and the high voltage V2 are changed over in a time sequential manner. In this case, the high voltage V2 is applied to the coil 31 at the beginning of valve opening, which ensures valve-opening responsiveness of the fuel injector 30. Subsequently, the low voltage V1 is applied to coil 31, which maintains the fuel injector 30 in a valve-open state.

Figure 3A:
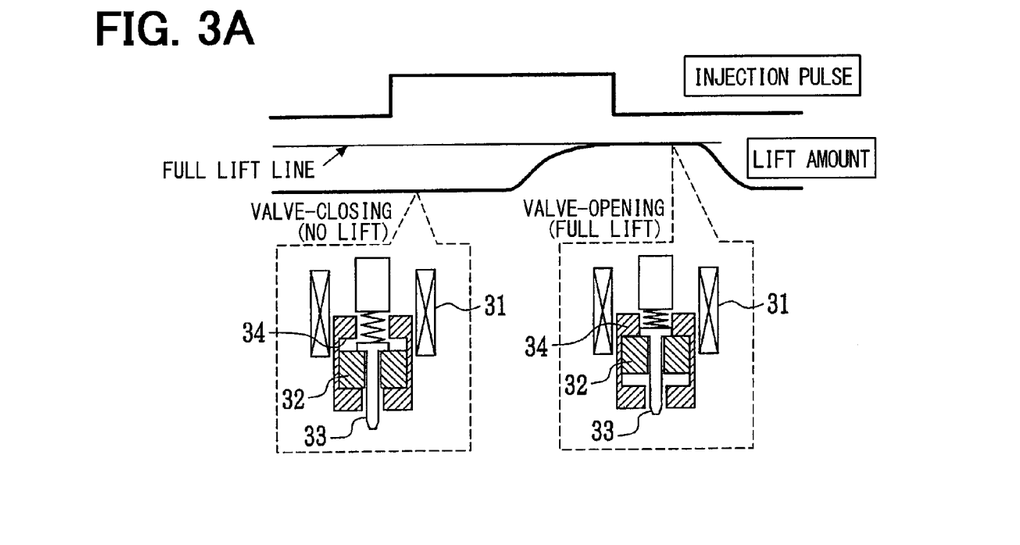
FIG. 3A illustrates a configuration and state of a fuel injector.
Figure 3B:
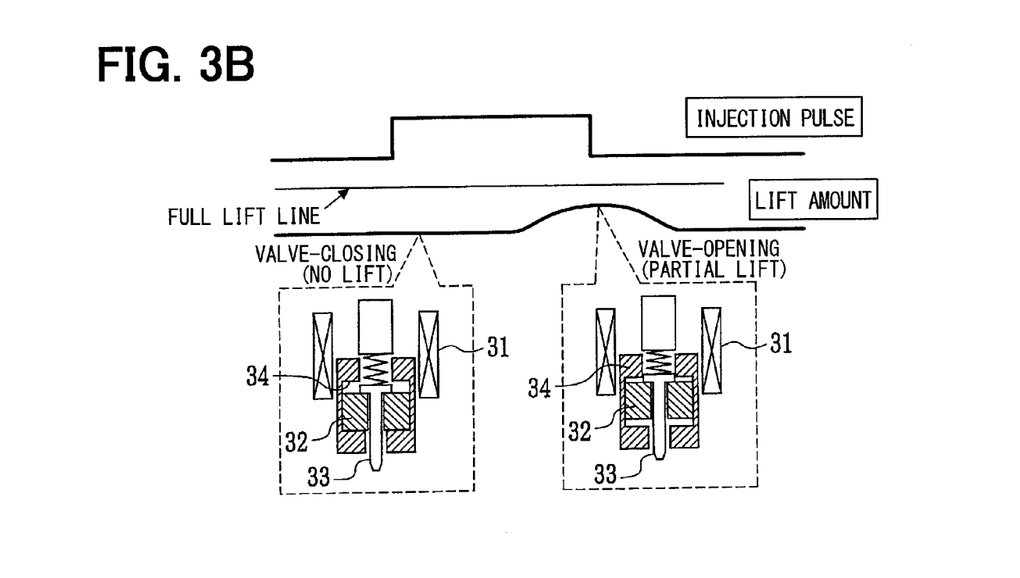
FIG. 3B illustrates a configuration and state of the fuel injector.

The first embodiment implements, as the driving of the fuel injector 30, partial lift injection by completing lift of the valve body of the fuel injector 30 in a partial lift state before the valve body reaches a full lift position and injecting a desired amount of fuel in this state. The partial lift injection will be described in brief with reference to FIGS. 3A and 3B. FIG. 3A illustrates operations in the full lift injection, and FIG. 3B illustrates operations in the partial lift injection.

The fuel injector 30 includes the coil 31 as an electromagnetic part that generates electromagnetic force by energization, and a needle 33 (i.e., the valve body) to be driven by the electromagnetic force integrally with a plunger 32 (i.e., a movable core). When the needle 33 has moved to a valve-open position, the fuel injector 30 is brought into a valve-open state to inject fuel. Referring to FIGS. 3A and 3B, a time of injection pulse (i.e., an energization period) differs. As illustrated in FIG. 3A, when the injection pulse width is relatively large (i.e., when the amount of lift of the needle is made to be a full lift amount), the needle 33 reaches the full lift position (i.e., a position at which the plunger 32 butts against a stopper 34). On the other hand, as illustrated in FIG. 3B, when the injection pulse width is relatively small (i.e., when the amount of lift of the needle is made to be a partial lift amount), the needle 33 is brought into the partial lift state in which the needle 33 has not reached the full lift position (i.e., a state in which the plunger 32 has not butted against the stopper 34). Further, when the energization of the coil 31 is stopped along with the falling of the injection pulse, the plunger 32 and the needle 33 return to the valve-closed position, so that the fuel injector 30 is brought into a valve-closed state to stop the fuel injection.

Referring back to FIG. 2, the current detector 44 detects the energization current for the coil 31 in valve opening of the fuel injector 30, and a result of the detection is successively outputted to the drive IC 42. The current detector 44 may have any well-known configuration and can include, for example, a shunt resistor and an amplification circuit.

Figure 4:
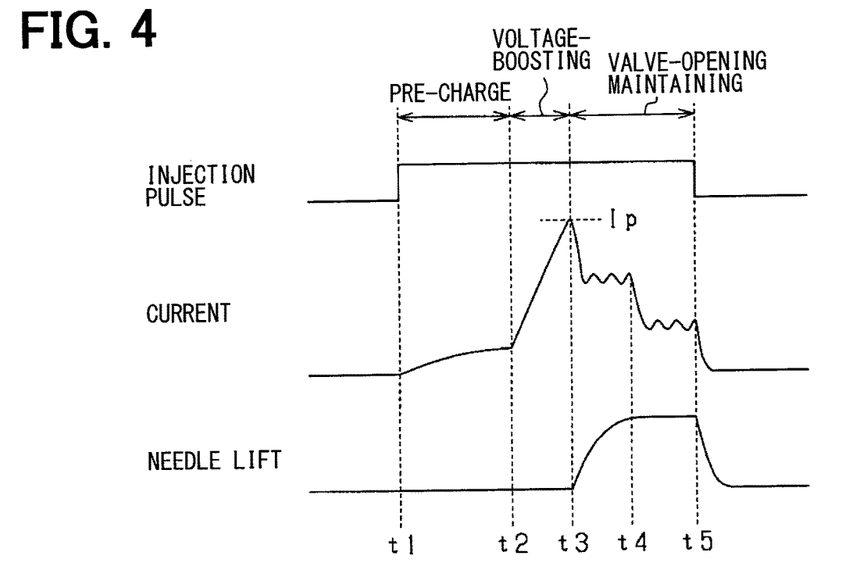
FIG. 4 is a time chart illustrating operations to drive the fuel injector.

With reference to FIG. 4, next, a description will be given of basic operations of driving the fuel injector 30. The basic operations are performed by the drive IC 42 and the electrifier 43, based on an injection pulse. In the first embodiment, pre-charging, voltage-boosting driving, and valve-opening maintaining driving are performed in a time sequential manner in a period in which the injection pulse is on. The pre-charging is to apply the low voltage V1 to the coil 31 prior to the application of the high voltage V2 to the coil 31, at the start of energization of the fuel injector 30. The pre-charging allows shortening of a time until the energization current reaches a target peak value. The voltage-boosting driving, which is performed for improving the valve opening responsiveness, is to apply the high voltage V2 to the coil 31 in a voltage-boosting driving period. The valve-opening maintaining driving, which is performed subsequently to the voltage-boosting driving, is to apply the low voltage V1 to the coil 31.

Referring to FIG. 4, the injection pulse is turned on at a point in time t1, and the pre-charging with the low voltage V1 is performed from the point in time t1 to a point in time t2. In the pre-charge period from t1 to t2, the coil 31 is fed with a pre-charge current which is smaller than a current for operating the needle 33. The pre-charge period is preferably a preset time. In the pre-charge period, the pre-charging may be performed in such a manner that the switching element 53 is repeatedly turned on and off at a predetermined duty ratio.

At the point in time t2, the voltage applied to the coil 31 is changed from the low voltage V1 to the high voltage V2. In a voltage-boosting driving period from the point in time t2 to a point in time t3, thus, the drive current abruptly increases as compared with the pre-charge current which is the energization current in the period from t1 to t2. At the point in time t3, the drive current reaches a predetermined target peak value Ip and, then, the application of the high voltage V2 is stopped. At this time, lifting of the needle is started at the timing that the drive current has reached the target peak value Ip or at the timing immediately before the drive current reaches the target peak value Ip. Fuel injection is started along with the lifting of the needle. The determination as to whether the drive current has reached the target peak value Ip is made based on the detection current detected by the current detector 44. Specifically, in the voltage-boosting driving period (from t2 to t3), the drive IC 42 determines whether the detected current is more than or equal to the target peak value Ip. At a point in time that the detection current is more than or equal to the target peak value Ip, the electrifier 43 changes the voltage applied to the coil (i.e., stops the application of the high voltage V2).

At and after the point in time t3, the drive current decreases in accordance with the stop of the application of the high voltage V2. However, the low voltage V1 is intermittently applied to the coil 31 based on a preset current threshold value and the detection current detected by the current detector 4. Further, referring to FIG. 4, the current threshold value is defined to have two levels, and the low voltage V1 is applied every time the drive current (i.e., the detection current) becomes less than or equal to the threshold value. Preferably, the change of the current threshold value (the change from the high threshold value to the low threshold value) is implemented at the timing that the lifting of the needle is estimated to have reached a predetermined amount of partial-lift (a point in time t4 in FIG. 4).

At a point in time t5, the injection pulse is turned off and then the application of the voltage to the coil 31 is stopped, so that the drive current comes to be zero. Further, the lifting of the needle is completed in accordance with the stop of the energization of the coil, so that the fuel injection is stopped.

Figure 5:
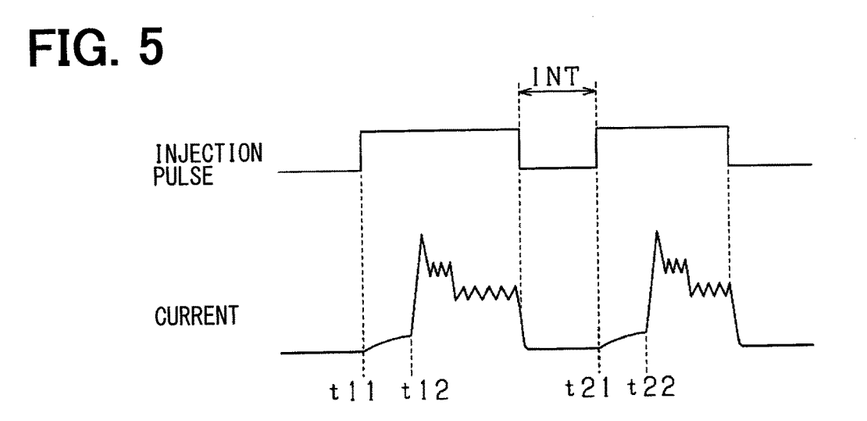
FIG. 5 is a time chart illustrating the general outline of multistage injection.

Further, the first embodiment allows multistage injection in which multiple times of fuel injection are implemented in one combustion cycle. FIG. 5 illustrates a waveform of driving in two times of fuel injection (i.e., preceding fuel injection and subsequent fuel injection) of the multiple times of fuel injections in the multistage injection. In FIG. 5, an interval time INT is interposed between preceding and subsequent two injection pulses. In this case, in the preceding fuel injection, energization with a pre-charge current is started at a point in time t11, and energization with a drive current is started at a point in time t12. Further, in the subsequent fuel injection, an energization with a pre-charge current is started at a point in time t21, and an energization with a drive current is started at a point in time t22.

The frequencies of fuel injection in the multistage injection are preferably determined based on the engine running state such as the engine speed or the engine load. The interval time in the multistage injection is also preferably determined based on the engine running state. In the first embodiment, in cases of multistage injection having three or more stages, the interval times between the respective times of fuel injection are made equal to each other. Alternatively, the interval times between the respective times of fuel injection can also be made different from each other.

In the period in which the drive current increases after the pre-charging (i.e., in the voltage-boosting driving period), the inclination of the current change varies due to various factors, and this variation causes a variation in the amount of fuel injection. More specifically, it is considered that at the start of the energization with the drive current, the inclination of the rising change of the drive current varies depending on the electric energy accumulated by the coil energization prior to the start of the energization. For example, at the point in time t1 in FIG. 4, the point in time t11, and the point in time t12 in FIG. 5, the speed of increase in the drive current varies after the respective points in time depending on the electric energy in the coil 31 at the respective points in time.

In the first embodiment, hence, a current change parameter correlated with the speed of the rising change in the drive current is calculated, and the feed of the pre-charge current to the coil 31 is controlled based on the current change parameter. More specifically, a reach time until the drive current reaches a certain current threshold value and an interval time in the multistage injection are calculated as the current change parameters. The pre-charge control is implemented based on the current change parameters.

After the energization of the coil at the completion of fuel injection, the coil 31 possesses magnetism yet, and the magnitude of the remaining magnetism depends on the time which has elapsed since the completion of the energization. In this case, in consideration of the interval time in the multistage injection, the remaining magnetism resulted from the preceding fuel injection is varied in magnitude depending on the interval time and, therefore, the interval time influences the rising speed of the drive current after the pre-charging. Therefore, the interval time is set as one of the current change parameters.

Figure 6:
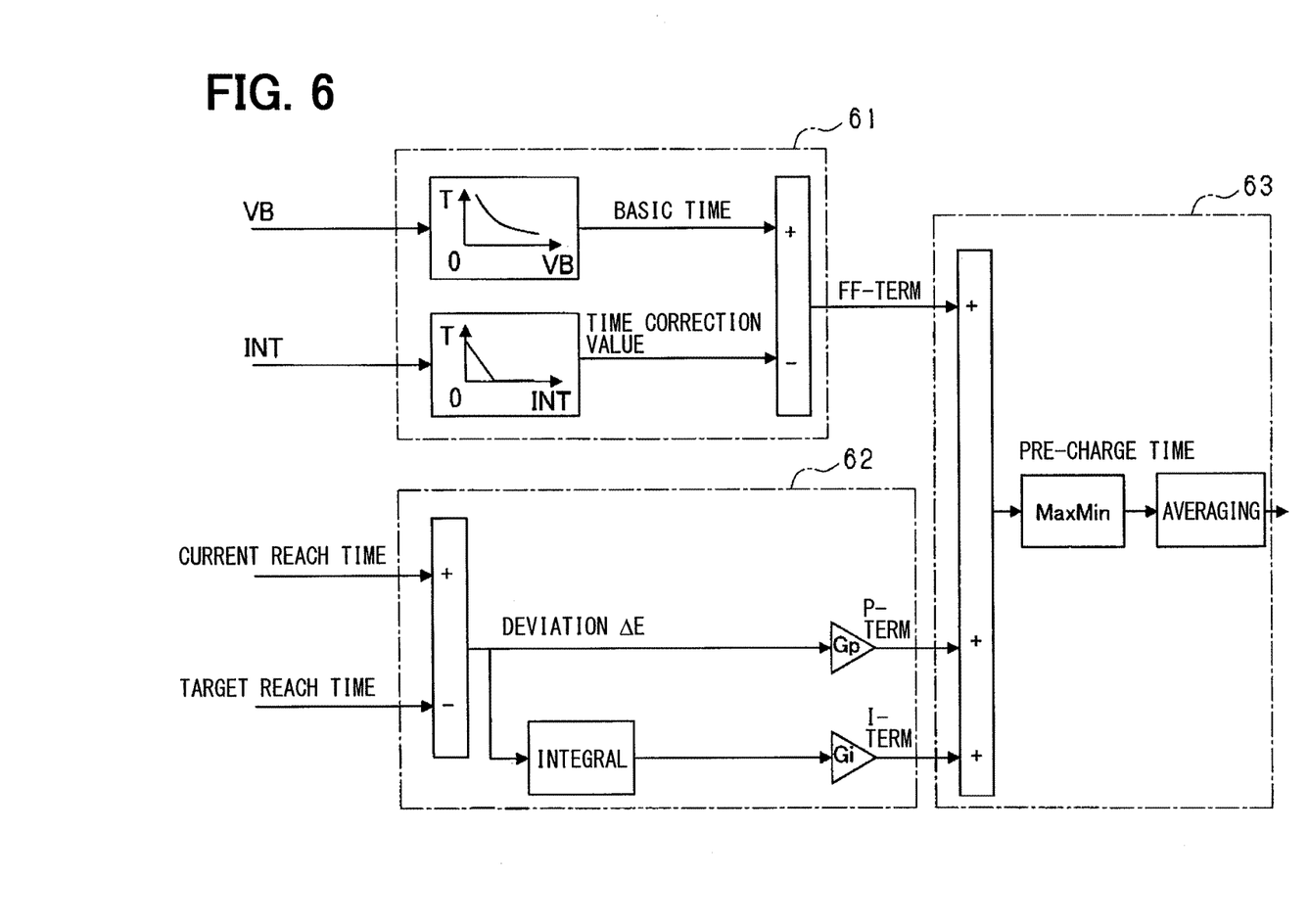
FIG. 6 is a functional block diagram illustrating details of calculation of a pre-charge time.

With reference to a functional block diagram of FIG. 6, next, a description will be given of details of the calculation of a pre-charge time. Functions illustrated in FIG. 6 are realized by the ECU 40. Referring to FIG. 6, a feedforward term (FF-term) and a feedback term (FB-term) for the pre-charge time are calculated based on various parameters. Further, the pre-charge time is calculated using the FF-term and the FB-term.

Referring to FIG. 6, an FF-term calculation part 61 calculates a basic pre-charge time based on a battery voltage VB, and also calculates a time correction value based on the interval time INT. Further, the FF-term calculation part 61 calculates an FF-term from the basic pre-charge time and the time correction value (FF-term=basic pre-charge time−time correction value). In this case, the basic pre-charge time is calculated to have a larger value as the battery voltage VB is smaller. The time correction value is calculated to have a larger value as the interval time INT is shorter, when the interval time INT is less than a predetermined value. If the interval time INT is more than or equal to the predetermined value, the time correction value equals to zero.

Preferably, the interval time INT is a value calculated as information about control of multistage injection or a value measured actually by a timer, a counter, or the like. In cases of the first fuel injection in the multistage injection or in cases of not implementing the multistage injection, the interval correction is unnecessary, and the time correction value is not calculated.

An FB-term calculation part 62 acquires a current reach time which is a time until the drive current reaches the target peak value Ip after the start of energization with the drive current, and a target reach time which is a target value of the current reach time. Further, the FB-term calculation part 62 calculates an FB-term based on a deviation $\Delta E$ of the current reach time from the target reach time (=current reach time− target reach time). In this case, the deviation $\Delta E$ is calculated from the current reach time calculated using a timer, a counter, or the like, and the target reach time which is already known. The target reach time may be calculated based on the target peak value Ip and the like. Further, a P-term and an I-term are calculated based on the deviation $\Delta E$, using a predetermined proportional gain and a predetermined integrational gain. In the first embodiment, the time from the turning-on of the injection pulse is defined as "the reach time". Besides, the time from the start of energization with the drive current (the completion of the pre-charging) may also be defined as "the reach time".

In this case, the FB-term is calculated to have a positive value when the deviation $\Delta E$ is positive, and the FB-term is calculated to have a negative value when the deviation $\Delta E$ is negative. Further, the F/B-term is calculated to have a larger value in the positive direction or in the negative direction as the deviation $\Delta E$ is larger.

A time calculation part 63 calculates a pre-charge time by addition of the FF-term and the FB-term (P-term+I-term). Further, upper/lower limit guard and averaging processing may be performed on the value resulted from the addition of the FF-term and the FB-term. This inhibits erroneous calculations of the pre-charge time due to temperature characteristics and individual variations and also inhibits an abrupt change in the pre-charge time.

Figure 7:
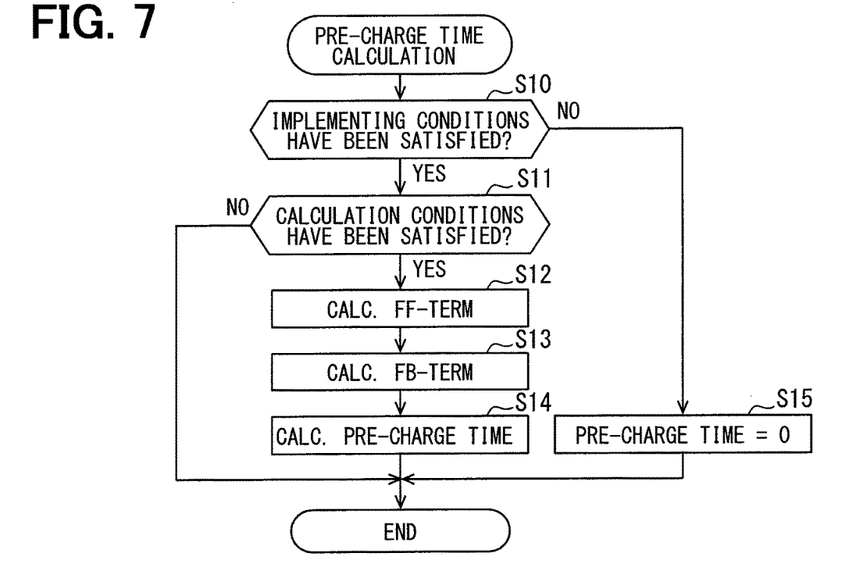
FIG. 7 is a flowchart illustrating a processing procedure of calculating the pre-charge time.

FIG. 7 is a flowchart illustrating a procedure for calculating a pre-charge time, and the processing is repeatedly executed at a predetermined cycle by the ECU 40.

Referring to FIG. 7, in step S10, it is determined whether conditions required for implementing pre-charging have been satisfied. In step S11, next, it is determined whether conditions required for calculating a pre-charge time have been satisfied. The conditions required for implementing the pre-charging in step S10 include the condition that the engine 11 is not being in a transient state, the condition that no abnormality occurs at the drive IC 42 and various detection systems, and the like. Further, the conditions required for calculation in step S11 include the condition that the current fuel injection is fuel injection with the shortest injection pulse (coil energization time) of the respective times of fuel injection in the multistage injection, the condition that partial-lift injection is being implemented, and the like. If the respective conditions in both steps S10 and S11 have been satisfied, the processing proceeds to step S12.

In step S12, the FF-term for the pre-charge time is calculated. In this case, the FF-term is calculated by adding the time correction value calculated based on the interval time INT to the basic pre-charge time calculated based on the battery voltage VB.

In step S13, next, the FB-term for the pre-charge time is calculated. In this case, the target reach time, and the actual current reach time until the drive current reaches the target peak value Ip after the start of coil energization are acquired. Further, the deviation $\Delta E$ of the reach times is calculated, and, the FB-term is calculated through PI feedback operation based on the deviation $\Delta E$. The current reach time is not necessarily required to be the time required to reach the target peak value Ip and may be the time required to reach a current threshold value which is defined to be a value smaller than the target peak value Ip, based on the target peak value Ip.

In step S14, the pre-charge time is calculated by adding the FF-term and the FB-term (P-term and I-term). The pre-charge time calculated as described above is used in pre-charge control for the respective times of fuel injection in the multistage injection, in the subsequent fuel injection. In this case, the pre-charge control is implemented such that an integrated value of the pre-charge current in the pre-charge period is made larger, as the pre-charge time is increased.

If NO in step S10, the processing proceeds to step S15 in which the pre-charge time is set to zero and, thereafter, the processing ends. If NO in step S11, the processing ends without calculating the pre-charge time.

As the amount of pre-charge control, the pre-charge current can be used instead of the pre-charge time. In this case, the pre-charge time is set to be a fixed value and the pre-charge current is set to be variable, instead of setting the pre-charge current to be a fixed value and setting the pre-charge time to be variable. Regarding the configuration in FIG. 6, the FF-term calculation part 61 calculates an FF-term for the pre-charge current, and the FB-term calculation part 62 calculates an FB-term for the pre-charge current. Further, a controlled value of the pre-charge current is calculated from the FF-term and the FB-term. With this configuration, the pre-charge control is implemented such that the pre-charge current is made larger as the deviation $\Delta E$ (=current reach time−target reach time) is larger.

As the current change parameter, the speed of rising (the inclination of change) of the drive current may be employed instead of the current reach time, and the FB-term may be calculated based on this rising speed. In this case, preferably, the pre-charge time is made longer or the pre-charge current is made larger as the rising speed is smaller. In other words, an integrated value of the pre-charge current in the pre-charge period is made larger.

Figure 8:
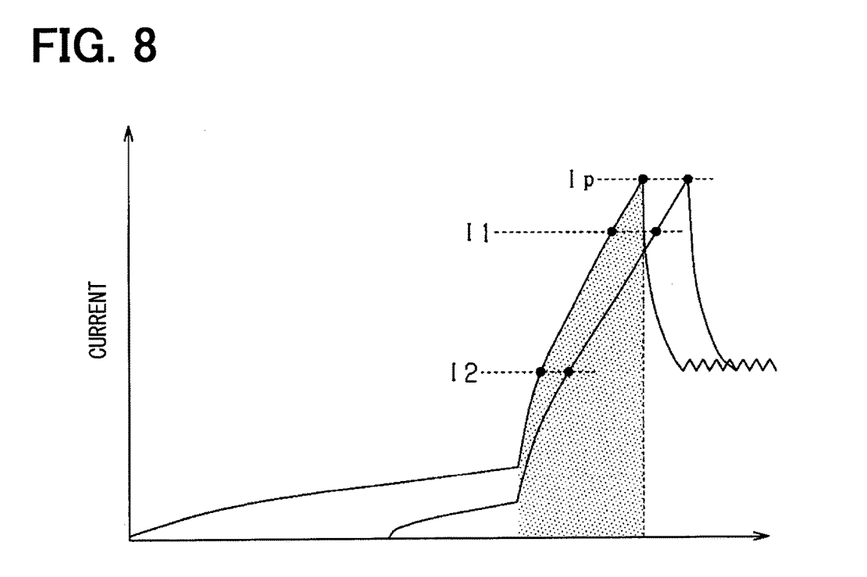
FIG. 8 illustrates calculation of a time-integrated value of a drive current.

Further, a time-integrated value of the drive current at the rising change in the drive current may be employed as the current change parameter, and the FB-term may be calculated based on this time-integrated value. In this case, preferably, the pre-charge time can be made longer or the pre-charge current can be made larger as the time-integrated value is smaller. For calculation of the time-integrated value, more specifically, as illustrated in FIG. 8, the target peak value Ip and other plural current values (I1 and I2 in the first embodiment) are preliminarily defined, and the reach times required to reach the respective values are detected. Further, the time-integrated value of the drive current (for example, a dotted portion in FIG. 8) is calculated based on the respective current values and the respective reach times.

The first embodiment produces the following advantages.

In fuel injection with the fuel injector 30, if the drive circuits for the fuel injector 30 vary due to an individual difference or a secular change, the amount of energy to be applied by pre-charging to the coil 31 becomes excessive or short. This might cause variations in amount of fuel to be injected. According to the above configuration, the feed of the pre-charge current to the coil 31 is controlled based on the current change parameter correlated with the speed of the rising change in the drive current. In this case, the speed of the rising change in the drive current depends on the amount of energy to be applied in the pre-charge period immediately before the feed of the drive current. Therefore, the use of the current change parameter correlated with the speed of the rising change allows a grasp of the excess or shortage of the amount of energy to be applied by pre-charging to the coil 31. Moreover, controlling the feed of the pre-charge current allows elimination of the excess or shortage of the amount of energy to be applied to the coil 31. This leads to appropriate control of the amount of fuel to be injected.

The reach time until the drive current reaches the certain current threshold value, the rising speed of the drive current, or the time-integrated value of the drive current at the rising change in the drive current is acquired as the current change parameter. Further, the pre-charge control is implemented such that the integrated value of the pre-charge current in the pre-charge period is made larger as the reach time is longer, as the rising speed is smaller, or as the time-integrated value is smaller. In this case, the current reach time, the current rising speed, and the time-integrated value of the drive current are parameters relating directly to the condition of the implementation of the pre-charging. By using them as current change parameters, it is possible to preferably implement the pre-charge control.

By changing the pre-charge time or by changing the pre-charge current, the integrated value of the pre-charge current in the pre-charge period is changed, which changes the rising speed of the drive current. In this case, by implementing the pre-charge control through an increase or decrease of the pre-charge time or the pre-charge current, it is possible to suppress variations in the drive current and to realize desired fuel injection.

It is considered that, in implementing the multistage injection, there is a larger influence of the valve-opening responsiveness as the energization time for each injection is shorter, that is, as the required amount of injection is smaller. In view of this circumstance, the pre-charge time (the amount of pre-charge control) is calculated in implementing injection with the shortest energization time, which can make the fuel injector 30 have appropriate valve-opening responsiveness, while suppressing the frequencies of calculation of the pre-charge time.

It is considered that, in the partial lift injection, there is a larger variation in the amount of fuel injection due to the valve-opening responsiveness of the fuel injector 30, in comparison with the full lift injection. In view of this circumstance, the pre-charge time (the amount of pre-charge control) is calculated in implementing the partial lift injection. Therefore, it is possible to appropriately suppress variations in amount of fuel injection in the partial lift injection.

Second Embodiment

Figure 9:
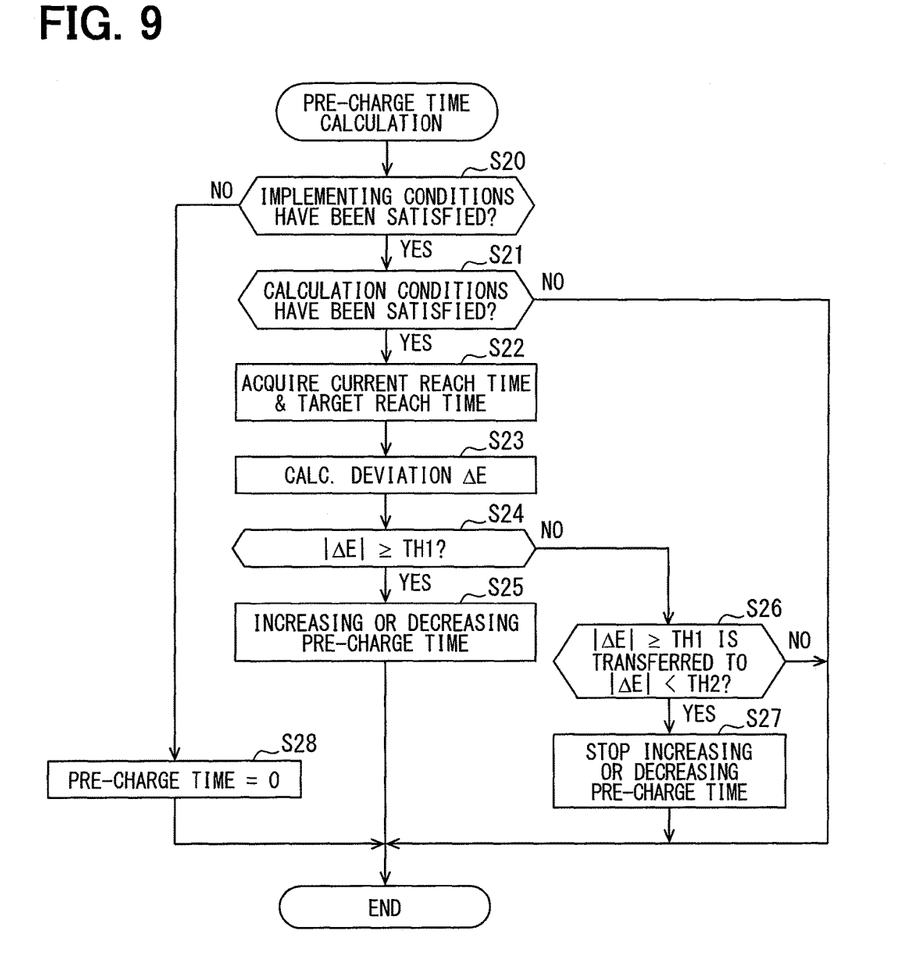
FIG. 9 is a flowchart illustrating a processing procedure of calculating a pre-charge time in a second embodiment.

A pre-charge time may be also calculated based on a flowchart of FIG. 9 instead of the flowchart of FIG. 7. Further, in the following processing, the process of calculating the FF-term is eliminated, and the existing value of the pre-charge time is calculated by increasing or decreasing the previous value of the pre-charge time, based on the deviation $\Delta E$ of the current reach time from the target reach time.

Referring to FIG. 9, in step S20, it is determined whether conditions required for implementing pre-charging have been satisfied. In step S21, next, it is determined whether conditions required for calculating a pre-charge time have been satisfied (similar to steps S10 and S11 in FIG. 7). If the respective conditions have been satisfied, the processing proceeds to step S22.

In step S22, the target reach time, and the current reach time until the drive current reaches the target peak value Ip are acquired. In step S23, next, the deviation $\Delta E$ is calculated by subtracting the target reach time from the current reach time.

In step S24, next, it is determined whether the absolute value of the deviation $\Delta E$ is more or than equal to a first threshold value TH1. If the relationship of $|\Delta E| \geq TH1$ is held, the processing proceeds to step S25 in which the existing value of the pre-charge time is calculated by increasing or decreasing the previous value of the pre-charge time, in accordance with the deviation ΔE. In this case, for example, if the deviation ΔE is positive (the current reach time is more than the target reach time), the existing value of the pre-charge time is calculated by increasing the previous value of the pre-charge time by a predetermined value. On the other hand, if the deviation ΔE is negative (the current reach time is less than the target reach time), the existing value of the pre-charge time is calculated by decreasing the previous value of the pre-charge time by a predetermined value. The pre-charge time calculated in step S25 is used for subsequent fuel injection.

If it is determined, in step S24, that the relationship of |ΔE|<TH1 is held and the processing proceeds to step S26, it is determined whether a transition from the state of |ΔE|≥TH1 to a state of |ΔE|<TH2 is effected in the existing fuel injection. In this case, TH2 is less than TH1. At this time, a situation where the relationship of |ΔE|<TH2 has come to be held indicates that the deviation ΔE has converged to a minute value. In this case, the processing proceeds to step S27 in which increasing or decreasing of the pre-charge time is stopped. If NO in both steps S24 and S26, the pre-charge time at this point in time is used, as such, for pre-charge control, without being increased or decreased. Thus, the pre-charge time is fixed.

If NO in step S20, the processing proceeds to step S28 in which the pre-charge time is set to zero and, thereafter, the processing ends. If NO in step S21, the processing ends without calculating the pre-charge time.

If the absolute value of the deviation ΔE of the current reach time is more than or equal to the first threshold value TH1, the pre-charge time for the subsequent fuel injection is corrected to be increased or decreased by a predetermined value. Thereafter, if the absolute value of the deviation ΔE is less than the second threshold value TH2 in the fuel injection after increasing or decreasing the pre-charge time, the increase or decrease of the pre-charge time is stopped. In this case, it is possible to preferably suppress variations in the amount of fuel injection, while reflecting differences of the individual driving circuit and the individual fuel injector 30, changes of temperature conditions and the like.

Third Embodiment

In a third embodiment, based on the premise that multistage injection is implemented, an interval time in the multistage injection and a current value immediately before the completion of energization in preceding fuel injection are used as current change parameters. Further, a pre-charge time is variably determined based on the current change parameters.

Figure 10:
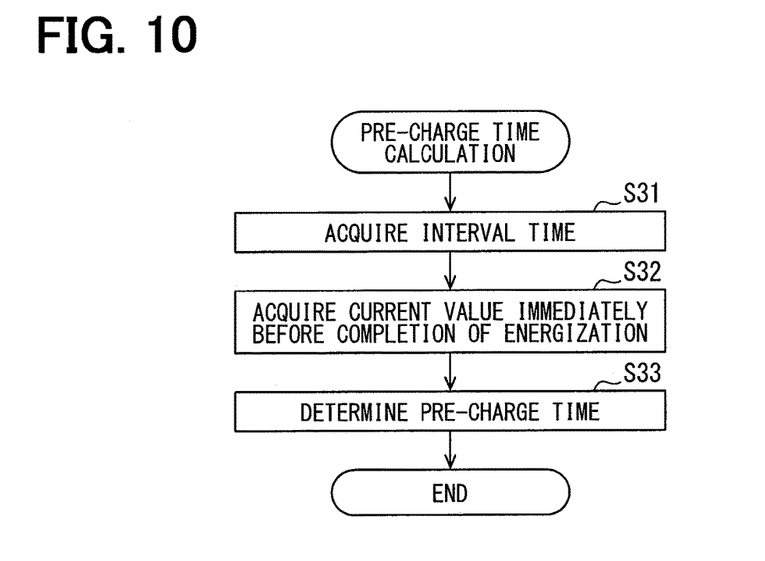
FIG. 10 is a flowchart illustrating a processing procedure of calculating a pre-charge time in a third embodiment.

FIG. 10 is a flowchart illustrating a procedure for calculating a pre-charge time. The processing is repeatedly executed at a predetermined time cycle by the ECU 40. Further, in FIG. 10, similarly to FIG. 7, it is also possible to determine whether conditions required for implementing pre-charge and conditions required for calculating the pre-charge time have been satisfied, but they are not illustrated herein for convenience.

Referring to FIG. 10, in step S31, the interval time between the preceding fuel injection and the existing fuel injection is acquired. In step S32, next, a current value immediately before the completion of energization in the preceding fuel injection is acquired. Each of the interval time and the current value immediately before the completion of energization may be an actually-measured value or a calculated value regarding control. Further, in step S33, the pre-charge time is determined, based on the interval time and the current value immediately before the completion of energization, using a map in FIG. 11.

Figure 11:
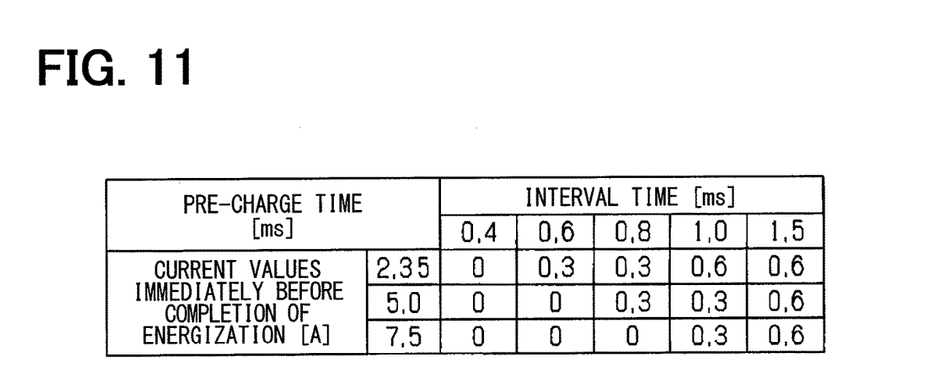
FIG. 11 illustrates a map for use in setting an interval time in the third embodiment.

In FIG. 11, plural current values are set as current values [A] immediately before the completion of energization in the preceding fuel injection and, further, plural times are set as interval times [ms], such that the pre-charge time [ms] is determined based on these parameters. In this case, as the interval time is shorter, the pre-charge time is determined to be a shorter time than those of when the interval time is longer than the short interval time. Further, as the current value immediately before the completion of the energization is larger, the pre-charge time is determined to be a shorter time than those of when the current value immediately before the completion of the energization is smaller than the large current value.

Referring to FIG. 11, there are provided areas which set the pre-charge time to be zero. According to whether the interval time and the current value immediately before the completion of energization correspond to these areas, it is possible to change between cases of implementing the pre-charging and cases of not implementing the pre-charging.

Figure 12A:
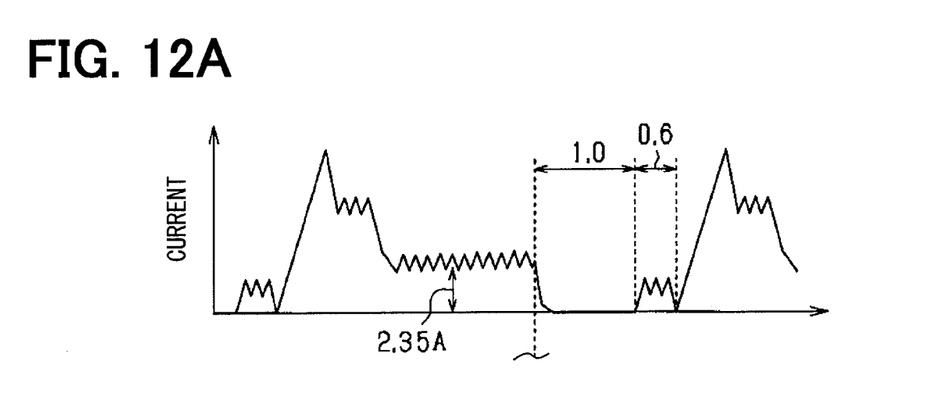
FIG. 12A is a time chart specifically illustrating a pre-charge control in the third embodiment.
Figure 12B:
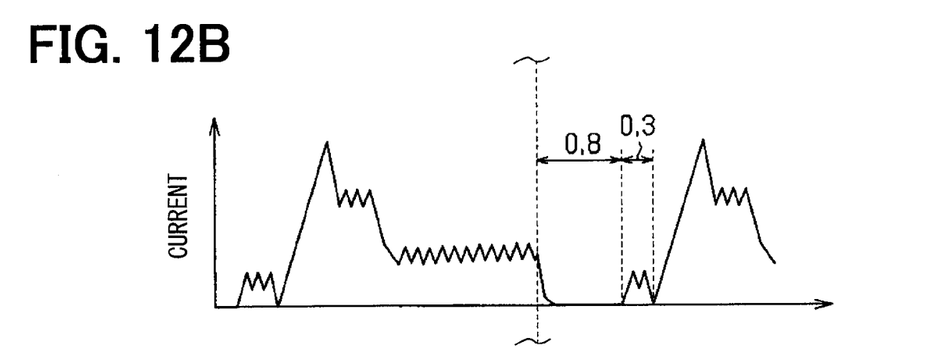
FIG. 12B is a time chart specifically illustrating a pre-charge control in the third embodiment.
Figure 12C:
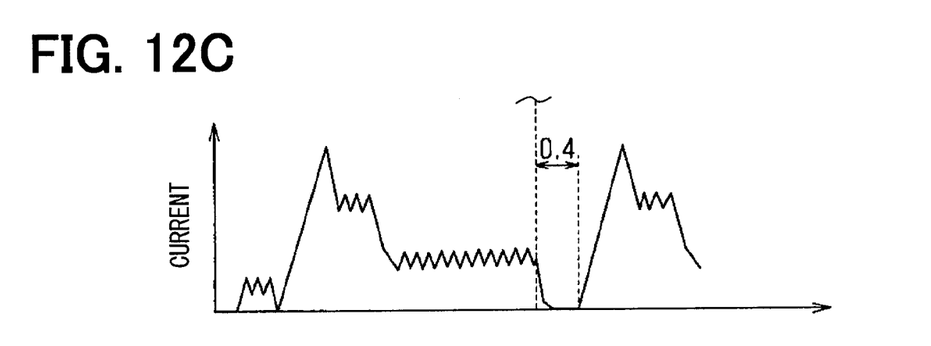
FIG. 12C is a time chart specifically illustrating a pre-charge control in the third embodiment.

With reference to FIGS. 12A to 12E, next, a specific description will be given of pre-charge control in the third embodiment. Referring to FIGS. 12A to 12C, the current values immediately before the completion of energization in the preceding fuel injection are all the same (2.35 A) and, besides, the interval times are set to be 1.0 ms, 0.8 ms and 0.4 ms, respectively. In this case, in FIGS. 12A to 12C, the respective pre-charge times are different from one another.

Figure 12D:
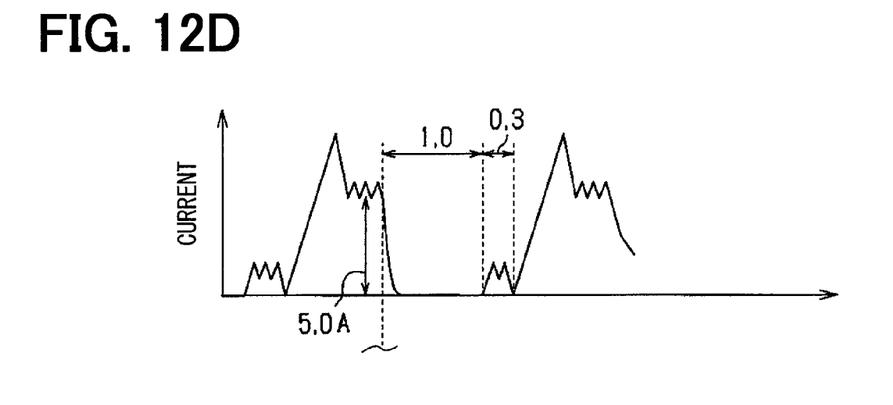
FIG. 12D is a time chart specifically illustrating a pre-charge control in the third embodiment.
Figure 12E:
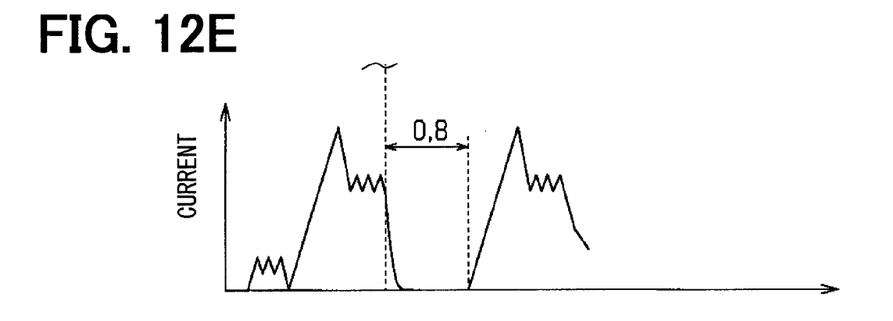
FIG. 12E is a time chart specifically illustrating a pre-charge control in the third embodiment.

Further, referring to FIGS. 12D and 12E, the current values immediately before the completion of energization in the preceding fuel injection are both set to be 5.0 A, which is larger than those in FIGS. 12A to 12C and, besides, the interval times are set to be 1.0 ms and 0.8 ms, respectively. In this case, in FIGS. 12D and 12E, the respective pre-charge times are different from one another.

In short, it is considered that, when the coil 31 possesses magnetism by the energization in the preceding fuel injection yet at the point in time of the start of the subsequent fuel injection, the drive current is made larger by being influenced by the remaining magnetism. Further, it is considered that, in such cases, there remains larger magnetism as the interval time interval in the multistage injection is shorter. Further, it is considered that there remains larger magnetism as the current value immediately before the completion of energization in the preceding fuel injection is larger. In view of this circumstance, the pre-charge time is made shorter when the interval time in the multistage injection is shorter and, further, the pre-charge time is made shorter when the current value immediately before the completion of energization in the preceding fuel injection is larger. This enables preferably implementing the pre-charge control, in taking account of the influence of the remaining magnetism.

Further, one of the interval time in multistage injection and the current value immediately before the completion of energization in the preceding fuel injection can be set to be a fixed value. In this case, preferably, the pre-charge time is variably determined, based on the variable one of them.

Fourth Embodiment

In implementing the multistage injection, as a pre-charge time is extended, the pre-charge period in the subsequent fuel injection gets closer to the energization period (the injection pulse) in the preceding fuel injection. It is considered that, in some cases, the pre-charging in the subsequent fuel injection may be started within the energization period for the preceding fuel injection. In such cases, there is raised a concern about excessive reduction of the amount of fuel injection in one combustion cycle. For example, on the assumption that actual injection is started (lifting of the valve body is started) at constant timing, there is raised a concern about exertion of an influence of the extension of the pre-charge time for the subsequent fuel injection on the preceding fuel injection. In a fourth embodiment, hence, an upper limit value of the pre-charge time is preliminarily set. Further, if the set value of the pre-charge time exceeds the upper limit value, the pre-charge time is restricted up to the upper limit value, and the injection pulse (the time of energization with the drive current) is corrected to be extended, based on the amount of excess of the pre-charge time.

Figure 13:
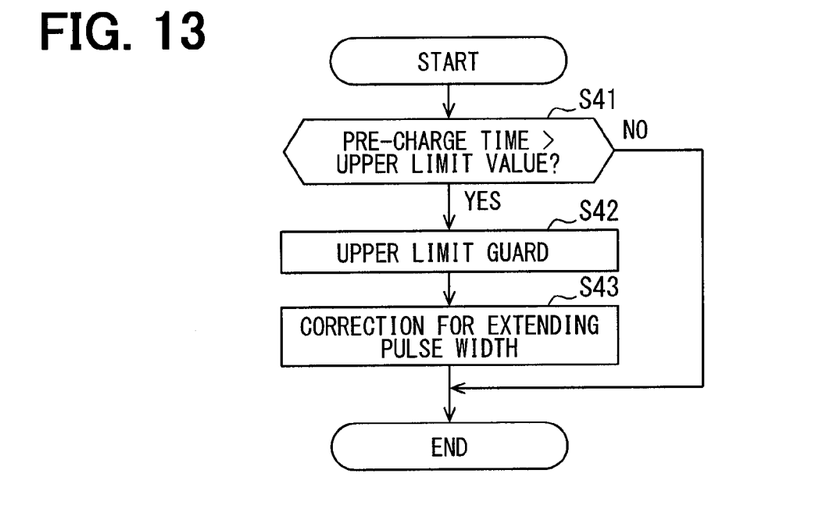
FIG. 13 is a flowchart illustrating a processing procedure of pulse correction in a fourth embodiment.

FIG. 13 is a flowchart illustrating a processing procedure for pulse correction according to the fourth embodiment. The processing is repeatedly executed at a predetermined time cycle by the ECU 40.

Referring to FIG. 13, in step S41, it is determined whether a pre-charge time (a pre-charge time calculated in FIG. 7, for example) exceeds an upper limit value. The upper limit value is preferably defined based on the timing of the start of the energization with the drive current for the subsequent fuel injection, for example, and is preferably set to be the value resulted from subtracting a margin from the time interval ΔT between the timing of the completion of the energization for the preceding fuel injection (the current injection) and the timing of the start of the energization with the drive current for the subsequent fuel injection (upper limit value=ΔT−margin).

If the pre-charge time is more than the upper limit value, the processing proceeds to step S42 in which the pre-charge time is guarded with the upper limit value. In step S43, next, a command for correction for extending the pulse width of the injection pulse for the subsequent fuel injection is issued. At this time, a relationship between amounts of excesses of the pre-charge time over the upper limit value, and extension correction values for extending the pulse width has been preliminarily defined as a map. An extension correction value for extending the pulse width is calculated using the map, and the injection pulse is corrected to be extended using this extension correction value. Further, the injection pulse is preferably extended regarding the last injection in multistage injection.

With the aforementioned configuration, when the extension of the pre-charge time may hinder the control of the amount of fuel injection, the injection pulse for a subsequent fuel injection is extended, instead of extending the pre-charge time. This implements fuel injection so as to ensure a desired amount of fuel, while suppressing variations of the energization waveform.

Other Embodiments

The aforementioned embodiments may be modified as follows, for example.

The pre-charge time or the pre-charge current may be determined, in taking account of temperature characteristics of the coil 31. In this case, under conditions where the coil 31 has been increased in resistance value with respect to a reference value, preferably, the pre-charge time or the pre-charge current is made larger, depending on the amount of the increase of the resistance value thereof.

The interval times in the multistage injection may be rest times between actual fuel injections caused by preceding and subsequent fuel injection pulses, as well as rest times between injection pulses.

Of cases of implementing the multistage injection and cases of not implementing the multistage injection, pre-charge control can be executed, based on current change parameters, only in the former cases. In this case, it is considered that, in cases of implementing the multistage injection, a time for one fuel injection is made shorter and, therefore, there is a larger influence of fuel injection variations. However, it is possible to preferably suppress such fuel injection variations.

The present disclosure can be also applied to other engines, as well as can be applied to gasoline engines. For example, the present disclosure can be also concretized as a fuel injection control device for a diesel engine.

The invention claimed is:

1. A fuel injection control device for an internal combustion engine including a fuel injector that includes a valve body and an electromagnetic part configured to move by energizing the valve body from a valve-closed position to a valve-open position and injects fuel when the valve body is moved to the valve-open position, the fuel injection control device being configured to, in fuel injection, feed a pre-charge current smaller than a current for operating the valve body, to the electromagnetic part in a pre-charge period at the beginning of a start of energization, and subsequently feed a drive current for operating the valve body, to the electromagnetic part, the fuel injection control device comprising:
   a parameter acquisition part that acquires a rising speed of the drive current, a reach time until the drive current reaches a certain current threshold value, or a time-integrated value of the drive current at a rising change in the drive current, as a parameter correlated with a speed of a rising change in the drive current; and
   a pre-charge control part that controls the feed of the pre-charge current to the electromagnetic part, based on the current change parameter acquired by the parameter acquisition part.

2. The fuel injection control device according to claim 1, wherein:
   the pre-charge control part implements pre-charge control such that an integrated value of the pre-charge current in the pre-charge period is made larger, as the rising speed is smaller, as the reach time is longer, or as the time-integrated value is smaller.

3. The fuel injection control device according to claim 1, wherein
   the pre-charge control part implements pre-charge control by variably setting, based on the current change parameter, an amount of pre-charge control defined using a pre-charge time which is a time length of the pre-charge period, or an amplitude of the pre-charge current in the pre-charge period.

4. The fuel injection control device according to claim 1, wherein
   the pre-charge control part includes:
   a calculation part that calculates a deviation of the current change parameter from a target value of the current change parameter;
   a correction part that corrects an amount of pre-charge control in the pre-charge period so as to increase or decrease the amount of pre-charge control by a predetermined value in subsequent fuel injection when the deviation is equal to or more than a first threshold value; and a correction stop part that stops the correction by increase or the correction by decrease when the deviation is less than a second threshold value smaller than the first threshold value, in fuel injection after the correction by increase or the correction by decrease.

5. The fuel injection control device according to claim 1, being configured to implement multistage injection in which multiple times of fuel injection are implemented in one combustion cycle, wherein the pre-charge control part calculates an amount of pre-charge control in the pre-charge period, based on the current change parameter calculated in implementing fuel injection in which the fuel injection value is electrified for a shortest time, of the respective times of fuel injection in the multistage injection, and utilizes the amount of pre-charge control for pre-charge control in another fuel injection.

6. The fuel injection control device according to claim 1, being configured to implement partial lift injection by completing lift of the valve body in a partial lift state before the valve body is brought into full lift, wherein the pre-charge control part implements the pre-charge control based on the current change parameter acquired by the parameter acquisition part, in implementing the partial lift injection.

7. The fuel injection control device according to claim 1, being configured to implement multistage injection in which multiple times of fuel injection are implemented in one combustion cycle, wherein:

the parameter acquisition part acquires, as the current change parameter, an interval time between preceding injection and subsequent injection in the multistage injection; and the pre-charge control part implements the pre-charge control so as to make an integrated value of the pre-charge current in the pre-charge period in a case where the interval time is short smaller than an integrated value of the pre-charge current in the pre-charge period in a case where the interval time is longer than the short interval time.

8. The fuel injection control device according to claim 7, wherein the pre-charge control part implements the pre-charge control or does not implement the pre-charge control in accordance with the interval time.

9. The fuel injection control device according to claim 1, being configured to implement multistage injection in which multiple times of fuel injection are implemented in one combustion cycle, wherein:

the parameter acquisition part acquires, as the current change parameter, a current value immediately before completion of energization in preceding fuel injection of the preceding fuel injection and subsequent fuel injection in the multistage injection; and the pre-charge control part implements the pre-charge control so as to make an integrated value of the pre-charge current in the pre-charge period in a case where the current value immediately before completion of energization in the preceding fuel injection is large smaller than an integrated value of the pre-charge current in the pre-charge period in a case where the current value immediately before completion of energization in the preceding fuel injection is smaller than the large current value.

10. The fuel injection control device according to claim 9, wherein the pre-charge control part implements the pre-charge control or does not implement the pre-charge control in accordance with the current value immediately before completion of energization in the preceding fuel injection.

11. The fuel injection control device according to claim 1, wherein:

the pre-charge control part implements the pre-charge control by variably setting a pre-charge time which is a time length of the pre-charge period, based on the current change parameter; and the pre-charge control part includes a correction part that restricts, when a set value for the pre-charge time exceeds a predetermined upper limit value, the pre-charge time up to the upper limit value, and corrects a time of energization with the drive current so as to increase the time of energization, based on the amount of excess of the pre-charge time.

* * * * *